UNITED STATES PATENT OFFICE.

WILLIAM T. VAN ZANDT AND LUCIEN A. TARTIÈRE, OF NEW YORK, N. Y.

IMPROVEMENT IN FIRE-PROOF BUILDING-BLOCKS.

Specification forming part of Letters Patent No. 136,684, dated March 11, 1873.

*To all whom it may concern:*

Be it known that we, WM. T. VAN ZANDT and LUCIEN A. TARTIERE, of the city, county, and State of New York, have invented a new and useful Improvement in Fire-Proof Building-Blocks and Cement, of which the following is a specification:

Our invention consists in the use of asbestus and plaster of Paris in combination with saw-dust, coke-dust, cinders, sand, or other suitable material, to form fire-proof blocks or bricks for walls, roofs, ceilings, floors, and partitions, the material being made plastic with water and shaped in molds.

The qualities of asbestus and gypsum to resist heat and combustion are well known. By the combination we have devised not only is an absolutely fire-proof material produced, but, by reason of the tenacity of asbestus, the fragility of plaster castings is overcome, and a strong enduring material is given. Saw-dust gives great elasticity, while, since each particle is enveloped in a coating of plaster, the compound is fire-proof even without the addition of asbestus. Lightness and facility of handling are secured by the use of either saw-dust, coke-dust, or cinders, in place of sand.

The ingredients may be used in equal proportions, or the quantity of asbestus may be reduced. Of the solid material, one-third in bulk of calcined plaster, thoroughly but quickly mixed with a sufficient quantity of water to permit the molding, will be found a desirable measure. For outside walls, roofs, &c., Portland cement or silica may be used in connection with the other material, or as an outside dressing.

Having thus described our invention, we claim as new and desire to secure by Letters Patent—

The combination of asbestus and plaster of Paris with saw-dust, coke-dust, cinders, sand, or other suitable material, to form fire-proof bricks or building-blocks.

WM. T. VAN ZANDT.
     L. A. TARTIERE.

Witnesses:
 A. P. THAYER,
 T. B. MOSHER.